(12) United States Patent
Stalp

(10) Patent No.: US 7,314,053 B1
(45) Date of Patent: *Jan. 1, 2008

(54) LOAD SENSING SYSTEM

(76) Inventor: Timothy L. Stalp, 340 S. Beemer St., West Point, NE (US) 68788

( * ) Notice: Subject to any disclaimer, the term of this patent is extended or adjusted under 35 U.S.C. 154(b) by 0 days.

This patent is subject to a terminal disclaimer.

(21) Appl. No.: 11/699,660

(22) Filed: Jan. 30, 2007

Related U.S. Application Data (63) Continuation-in-part of application No. 10/691,601, filed on Oct. 24, 2003, which is a continuation-in-part of application No. 10/295,846, filed on Nov. 18, 2002, now Pat. No. 6,938,625.

(51) Int. Cl.
*B08B 3/04* (2006.01)

(52) U.S. Cl. ............... 134/56 R; 134/113; 134/117

(58) Field of Classification Search ............ 134/56 R, 134/113, 117; 366/239, 237; 451/396
See application file for complete search history.

(56) References Cited

U.S. PATENT DOCUMENTS

| | | | | |
|---|---|---|---|---|
| 1,868,268 A | * | 7/1932 | Zrebiec | 366/239 |
| 2,233,226 A | * | 2/1941 | Ramey | 267/125 |
| 2,370,614 A | * | 3/1945 | Bohm | 422/270 |
| 2,384,989 A | * | 9/1945 | Feucht | 173/130 |
| 3,080,196 A | * | 3/1963 | Darby | 298/1 R |
| 3,253,369 A | * | 5/1966 | Reichert et al. | 451/326 |
| 3,927,774 A | * | 12/1975 | Teske et al. | 414/323 |
| 3,995,591 A | * | 12/1976 | Garwood | 119/69.5 |
| 4,198,153 A | * | 4/1980 | Hamlin | 396/627 |
| 4,221,009 A | * | 9/1980 | Wright | 4/566.1 |
| 4,511,230 A | * | 4/1985 | Cartwright | 396/573 |
| 4,854,406 A | * | 8/1989 | Appleton et al. | 177/139 |
| 5,139,101 A | * | 8/1992 | Smith | 177/139 |
| 5,232,098 A | * | 8/1993 | St-Pierre et al. | 209/240 |
| 5,947,516 A | * | 9/1999 | Ishikawa | 280/755 |
| 6,092,976 A | * | 7/2000 | Kamiya | 414/636 |
| 6,627,825 B1 | * | 9/2003 | Creswick | 177/141 |
| 6,802,964 B2 | * | 10/2004 | Preisser et al. | 210/172.1 |
| 6,938,625 B2 | * | 9/2005 | Stalp | 134/56 R |

FOREIGN PATENT DOCUMENTS

CA 2 210 271 * 1/1998

* cited by examiner

*Primary Examiner*—Frankie L. Stinson
(74) *Attorney, Agent, or Firm*—Dennis L. Thomte; Thomte Law Office LLC (57) ABSTRACT

A load sensing system for maximizing the cleaning efficiency of particulate raw materials such as sand, gravel, rock, ores, etc., in a log washer by sensing the weight of the aggregate in the log washer tank and adjusting the angle of inclination of the tank for cleaning efficiency. The system includes a log washer tank pivoted at its lower end and supported by hydraulic cylinders at its upper end. A height sensor detects changes in the weight of the load and raises or lowers the upper end of the tank when low or high pressure limits are exceeded through solenoid activated hydraulic valves.

7 Claims, 6 Drawing Sheets

LOAD SENSING SYSTEM

CROSS-REFERENCE TO RELATED APPLICATION

This is a continuation-in-part application of Ser. No. 10/691,601 filed Oct. 24, 2003, which is a continuation-in-part application of Ser. No. 10/295,846 filed Nov. 18, 2002, now U.S. Pat. No. 6,938,625.

BACKGROUND OF THE INVENTION

1. Field of the Invention

The present invention relates generally to aggregate material cleaning systems. More specifically, the invention is a fully automatic, load sensing system for a log washer that is used for cleaning aggregate materials, such as rocks, gravel, sand and ores to remove dirt and waste materials. The system hydraulically changes the angle of incline of the washer tank dependent upon the weight of the aggregate within the log washer tank to ensure that the log washer tank is properly loaded with the solids for efficient cleaning action.

2. Description of the Related Art

The related art of interest describes various washing and weighing apparatus, but none recognizes the washing inefficiency problem and none discloses the present invention. There is a need for log washer for washing sand, gravel, ores, and similar particulate material, to maximize the cleaning action based upon variations in the weight of the load being cleaned. The problem exists because in conventional log washers the inclination angle of the washer tank is fixed, whereas the load fluctuates in weight. As a general rule, if the angle of incline of the tank is increased, production is decreased, but the cleansing action of the washer is increased. Prior to applicant's invention disclosed in the applications identified above, the only way to vary the angle of incline was by manually increasing or decreasing the height of the structure supporting the washer tank, a labor intensive process which involves temporarily shutting down the log washer while the supports are adjusted. Therefore, by automatically adjusting the incline of the washer tank according to the load of solids, adequate cleaning is accomplished to maximize the efficiency of the washing process. The related art will be discussed in the order of perceived relevance to the present invention. No art discloses the critical feature of automatically adjusting the incline of the washer or separator tank to adjust the weight of the solids load to the washer.

U.S. Pat. No. 3,807,558, issued Apr. 30, 1974, to Alton B. Hamm, describes an apparatus for separating lightweight debris from sand, gravel and logs comprising the flowing of water at a high velocity in a restricted flow path to one side of the rotating auger and rotating the logs. The granular and aggregate material is discharged into the water flow for removing unwanted lightweight debris prior to the movement of the granular material into the zone of operation of the auger of the sand screw or rotating logs of the log washer. The inclination of the apparatus is supported by fixed supports. The apparatus is distinguishable for requiring a restricted water flow path and fixed supports for its inclination angle.

Japanese Patent Application No. 7-253340, published Oct. 3, 1995, for Toshihiko Miyashita, describes an apparatus which can automatically perform an aggregate washing step in a pivotal mixing container with a spout, and emptying the aggregate material and liquid. The washer apparatus has a pair of supporting legs on a stage, and a base pad that may be rotated via a pivotal shaft in a vertical direction by the supporting legs to empty the contents. The aggregate mixing container has a mixing blade within rotated by a first drive motor which rotates with the container. The second drive motor rotates the mixing container and the first drive motor. The apparatus is distinguishable for being limited to a rotatable emptying feature for a mixing chamber.

U.S. Pat. No. 4,234,415, issued Nov. 18, 1980, to Enrique de Tuya Casuso, describes an apparatus for separating mixed solids of different specific gravities by means of a liquid medium comprising a rotatable frusto-conical separation chamber having a lighter solid outlet at one end, and a heavier solid outlet at the opposite end. A pair of frusto-conical chamber may be utilized to separate solids of three different specific gravities. The apparatus is distinguishable for its structural difference and its different objective of separating mixed solids of at least two different specific gravities.

U.S. Pat. No. 5,868,256, issued Feb. 9, 1999, to Maynard A. Teppo, describes a rotary clay material refiner apparatus comprising a horizontal rotating drum into which clay material and water are fed. The clay material and water form a slurry which is agitated by lifters within the drum. A series of adjustable lifters with the drum refine the slurry by lifting aggregates and rocks out of the slurry and discharging them out of the refiner apparatus. The refined slurry exits the drum through an opening and further processed. The apparatus is distinguishable for being confined to a horizontal rotating drum and requiring two separation steps.

U.S. Pat. No. 2,489,161, issued Nov. 22, 1949, to William Scholes, describes a gravity liquid separator apparatus for the separation of unspecified granular or lump material, comprising a tank minus an outlet wall and the bottom inclined up from the deep feeding end, wherein the material is fed from the bottom of the deep end by a continuous belt passing through an opening with a trailing rubber fabric sealing flap or an inflated pneumatic tube to minimize leakage. A rotary scraper is positioned midway in the apparatus. The apparatus is distinguishable for requiring a rotating material transporting belt within the tank.

U.S. Pat. No. 2,336,991, issued Dec. 14, 1943, to Chester I. Leveke, describes an apparatus for removing dirt, clay, shale, coal and the like material from gravel comprising an inclined elongated trough having a square cross-section, a substantially open top, a bottom gravel outlet in the forward end and a hopper, and a grave escape slot at the opposite end. A centered rotating cylindrical agitator has agitating blades and three portions of decreasing diameter to the outlet. The apparatus is distinguishable for lacking any adjustable inclination means.

U.S. Pat. No. 1,972,195, issued Sep. 4, 1934, to Marmakuke J. Lacey, Jr., describes an ore washer apparatus for washing ores such as phosphates, manganese and iron or concrete aggregates containing clay, chips and silt in a fixed inclined frame. The moving gear comprises 5 parallel chains bearing plow share blades rotating on 3 sprocket wheels to define a triangle as viewed from the side. The ores are added in the baffled rear end and pushed to the front end in water for discharging out of the water via a discharge throat. The apparatus is distinguishable for requiring an immovable fixed tank.

U.S. Pat. No. 1,695,021, issued on Dec. 11, 1928, to Samuel R. Puryear, describes an apparatus for separating solids comprising a substantially rectangular inclined tank with an enlarged rear end and twin screws. The solids such as mud balls mixed with gravel, lignite, coal, shale and shells are fed with water from a chute into the rear end of the tank. The lighter materials are flushed by water jets toward an adjustable weir and into a perforated conduit leading to a rear trough. The twin screws carry the heavier material up the inclined tank out of the water and into a delivery chute. The apparatus is distinguishable for requiring a rear separation trough and directional jets of water.

U.S. Pat. No. 2,025,841, issued Dec. 31, 1935, to Charles H. Young, describes an apparatus for washing gravel to remove shale, lignite, bark, water-logged wood and coal comprising an inclined tank on a frame support, and having a pair of screw conveyors which accept the heavier gravel feed from a shallow pan which discharges the heavier material in the rear. The screw conveyors move the gravel through the water to an outlet. Jets of water are also supplied continuously upward through the mixture from a bottom located pipe. The apparatus is distinguishable for requiring a fixed support.

U.S. Pat. No. 4,448,678, issued May 15, 1984, to Cecil C. Gentry, describes an inclined treatment trough having a two-section conveyor screw consisting of a notched screw in the front and a helical screw. In the rear of the trough, crushed lignite is fed into a settling pool of water having weir in the rear wall covering an exiting stream, while above the stream waste tailings flow over the rear wall. Water is sprayed above the trough. The lignite product exits at the front portion of the trough. Fixed supports are illustrated to obtain the inclination angle of the trough. The apparatus is distinguishable for requiring a two-section conveyor screw and fixed supports for inclining the trough.

U.S. Pat. No. 1,609,652, issued Dec. 7, 1926, to John L. McQueen, describes a log washer apparatus comprising twin screws having intermeshing paddles with cutting edges for washing sand, gravel, ores and manganese to remove clay, dirt and waste matter. The apparatus is distinguishable for requiring specific log washer screws.

U.S. Pat. No. 2,050,458, issued Aug. 11, 1936, to Melvin Ovestrud et al., describes a wheeled apparatus for treating quarried rock or pit run gravel to produce aggregates for concrete construction work comprising, in sequence, an upper scrubber chamber (inclined downward) receiving the raw feed, a coarse and fine particle conveyor, and a dehydrator chamber with an endless conveyor belt. A screen at the end of the scrubber chamber filters the smaller particles that pass down a hopper to a crusher. The apparatus is distinguishable for requiring multiple separating elements and a crusher, and lacking any adjustment of the inclination of the scrubber chamber.

U.S. Pat. No. 2,324,549, issued Jul. 20, 1943, to Paul L. Wigton, describes a spiral ore pulp classifier apparatus comprising an upwardly inclined open tank on fixed supports being fed ore pulp into the tank having a pool of water and a spiral conveyor. The pool end of the tank has an upper outlet for slime and a bottom outlet for a drain. Sand is discharged from the front end. The apparatus is distinguishable for requiring a fixed inclination.

U.S. Pat. No. 5,992,776, issued Nov. 30, 1999, to Gianni B. Arcaini et al., describes a process for processing ash from the mass burning of municipal waste utilizing various apparatus comprising a shear-force shredder for the size reduction of bulky items, impact cleaning of ferrous metal items, and a rotary washer for cleaning non-ferrous materials. The ash is sent through an air separation unit to remove paper, wood, plastic and other unburned debris before passing the ash to an eddy current separator for non-ferrous material removal. The ash is free of metal values, unburned materials and unshreddables, but must be treated to immobilize certain heavy metals. The ash is recycled through a closed loop to increase removal efficiency of the metals and the homogeneous nature of the recovered treated ash aggregate. The apparatus used in this process is distinguishable for failing to require an inclined separator.

United Kingdom Patent Application No. GB 2,280,384, published Jan. 2, 1995, for Patrick Brogan, describes a horizontal bucket wheel sand washer with a submerged recovered fine aggregate transporter apparatus limiting its movement to prevent agitating the flowing water. The submerged transporter apparatus may be a screw conveyor or a multi-bladed scraper mounted on a frame reciprocated by rams and guided in an elevated return movement over pivoted cams. The apparatus is distinguishable for its required horizontal structure.

Japanese Patent Application No. 8-168693A, published Jul. 2, 1996, for Kiyohiro Taniguchi, describes an inclined apparatus to prevent fine aggregate such as sand from being mixed with the muddy water being carried off by a conveyor belt when the fine aggregate such as sand is taken out from a water tank by a belt conveyor device. The silt is collected in a hopper and passed to a conveyor belt while the muddy water is collected in a separate container. The apparatus is distinguishable for lacking any change in the inclination.

Japanese Patent Application No. 9-203407A, published Aug. 5, 1.997, for Yoshimichi Ishii et al., describes a screw conveyor and washer apparatus comprising multiple washers connected in a single line via microjoints. Multiple screws with individual washers in a single line are attached to a supplying means of unknown material. Each washer is separated in turn at its microjoint part so that the screw with its washer is supplied. The apparatus is distinguishable for its required microjointed structure.

German Patent Application No. DE 199 28 287 A1, published Dec. 28, 2000, for Steffen Prieske, describes a method for disposing excavated waste material by conveying the waste material to a buffer container for delivery to a drum washer, wherein coarse particles are separated from finer particles, and the overflow is supplied to a hydrocyclone screen apparatus for recycle of the fluid and the disposal of the solids to a dump. The apparatus is distinguishable for requiring a drum washer and a hydro-cyclone screen.

None of the above inventions and patents, taken either singly or in combination, is seen to describe the instant invention as claimed. Thus, a load sensing system solving the aforementioned problems is desired.

SUMMARY OF THE INVENTION

The present invention is directed to a load sensing system for log washers for washing coarse materials such as rocks, sand, gravel, and ores in order to improve the washing process in an open inclined tank. A conventional log washer apparatus is measurably affected by the angle at which the washer tank is fixed. If the washer load becomes too light for the angle of incline of the tank, the cleansing action becomes inadequate. Conventional log washer tanks have no automated mechanism for automatically adjusting the inclination of the tank in response to changes in the quantity of the load. The present invention automatically changes the angle of incline of the washer apparatus by adding hinges to the lower portion of the tank and hydraulic cylinders to raise and lower the upper portion of the tank in response to changes sensed in weights caused by the load in the washing tank.

In the load sensing system of the present invention, the lower end of the log washer tank is mounted on a hinged support, and the upper end is supported by a pair of hydraulic cylinders or rams. A sensor device, such as a load cell or the like, senses changes in the weight of the load in the tank and activates solenoid switches connected to hydraulic valves and to an electric motor that activates a hydraulic pump in order to raise or lower the hydraulic rams as required to maximize the washing action.

If the weight of the aggregate in the log washer tank is low as sensed by the weight sensor, the total weight of the material in the washer tank is considered below the optimum weight desired. Therefore, the sensor will cause a hydraulic pump to be activated by a starter motor and a hydraulic valve. This action will create the hydraulic flow that flows through a flow divider circuit to a pair of hydraulic cylinders to increase the incline of the washer tank. The elevated washer tank end will rise until the load weight increases, or until a high limit switch indicates that maximum extension of the rams is reached. The first hydraulic valve will then close to hold the washer tank position. When the load increases in weight, the sensor will sense this condition and will activate a latching relay device in the tank lowering circuit. The lowering valve is activated to allow the hydraulic oil back through the divider-combiner valve to the oil tank. The lowering valve will lower the washer tank as long as the load in the washer tank is sufficient to activate the weight sensor.

If the bottommost incline value is not reached, and the load decreases, the weight sensor will activate the latching relay in the raising circuit to increase the inclination angle of the washer tank. If the washer tank load reaches the lowest incline limit, the system will operate at the setting of the inclination angle until the low limit sensor detects the lower weight of a light load, and activates the latching relay in the tank raising circuit. A needle valve regulates how rapidly the tank lowers. A high pressure relief valve diverts or bleeds off hydraulic oil to return to the oil reserve tank, if the high pressure limit setting is reached. A check valve is required to ensure that the hydraulic oil does not flow in the opposite direction. Thus, the load sensing system operates to maximize the washing process for an open inclined tank.

Accordingly, it is a principal object of the invention to provide a load monitoring system for monitoring the solid load relative to the quantity of water added to a log washer apparatus.

It is another object of the invention to maximize the washing efficiency of a log washer tank by monitoring the load to raise or lower the inclination of the wash tank.

It is a further object of the invention to change the inclination of the wash tank by measuring the weight of the load to maximize the washing efficiency process.

Still another object of the invention is to utilize a hydraulic system for changing the inclination of the washer tank.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1A:
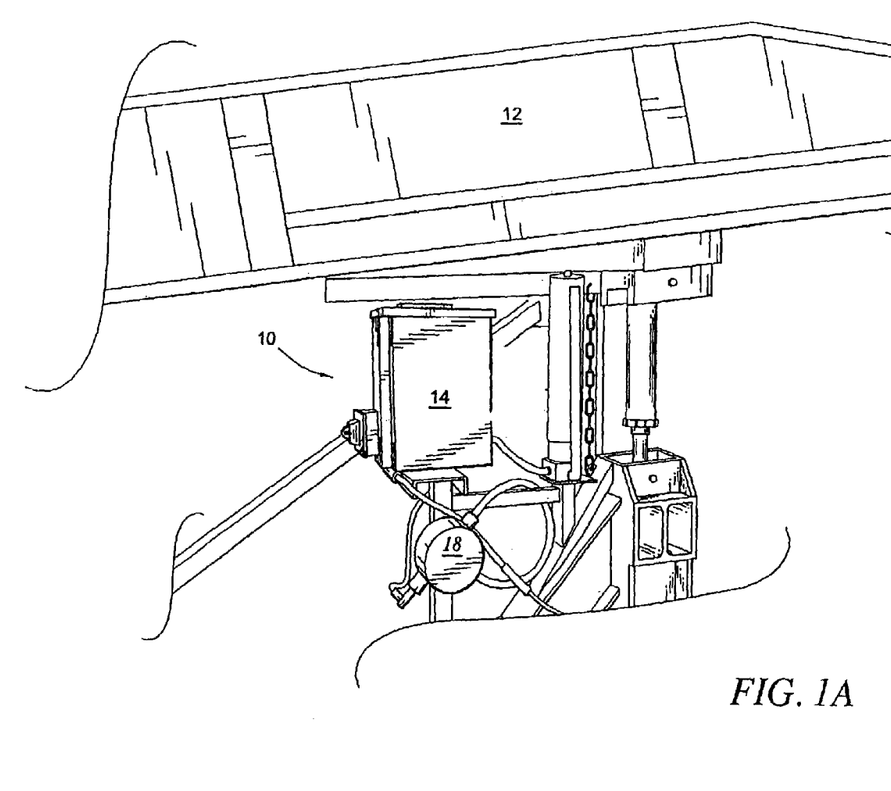
FIG. 1A is an environmental, perspective side view of a portion of a load sensing system applied to the loading of a particulate washing tank according to the present invention.
Figure 1B:
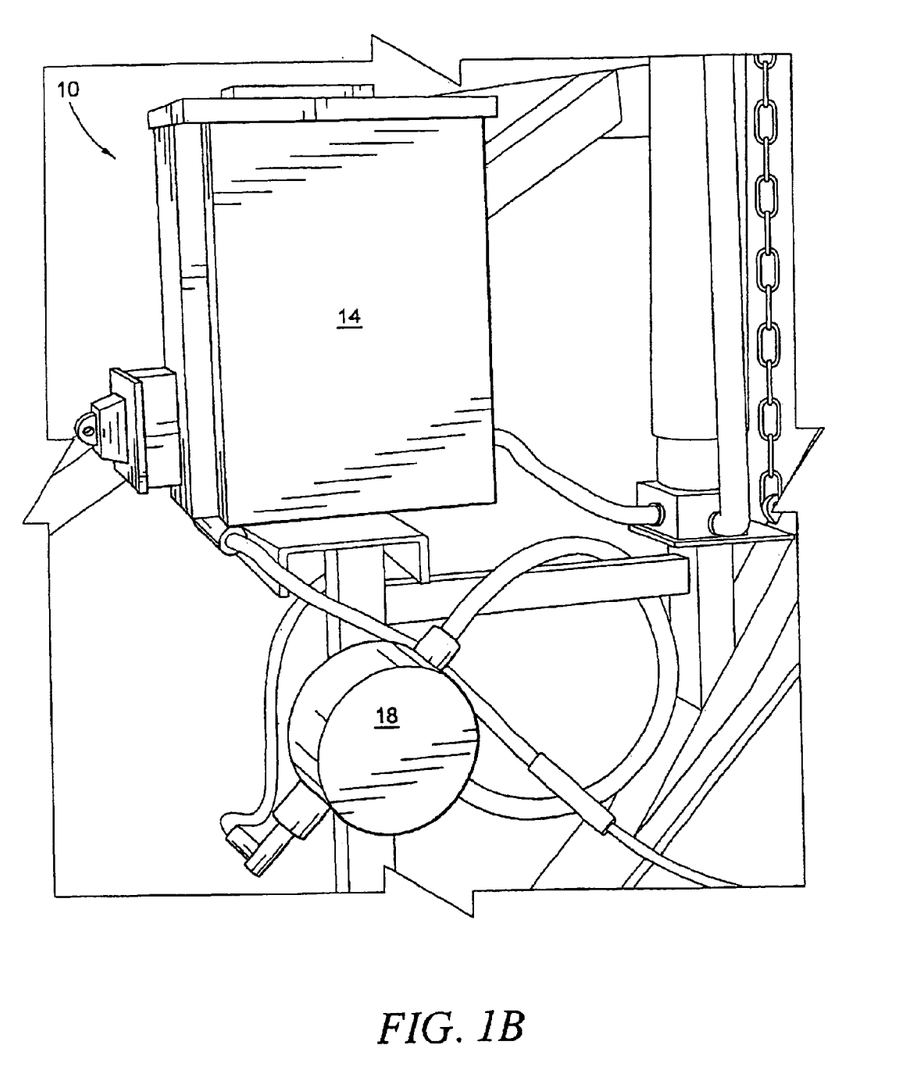
FIG. 1B is an enlarged-scale perspective view of the FIG. 1A load sensing apparatus according to the present invention.
Figure 2:
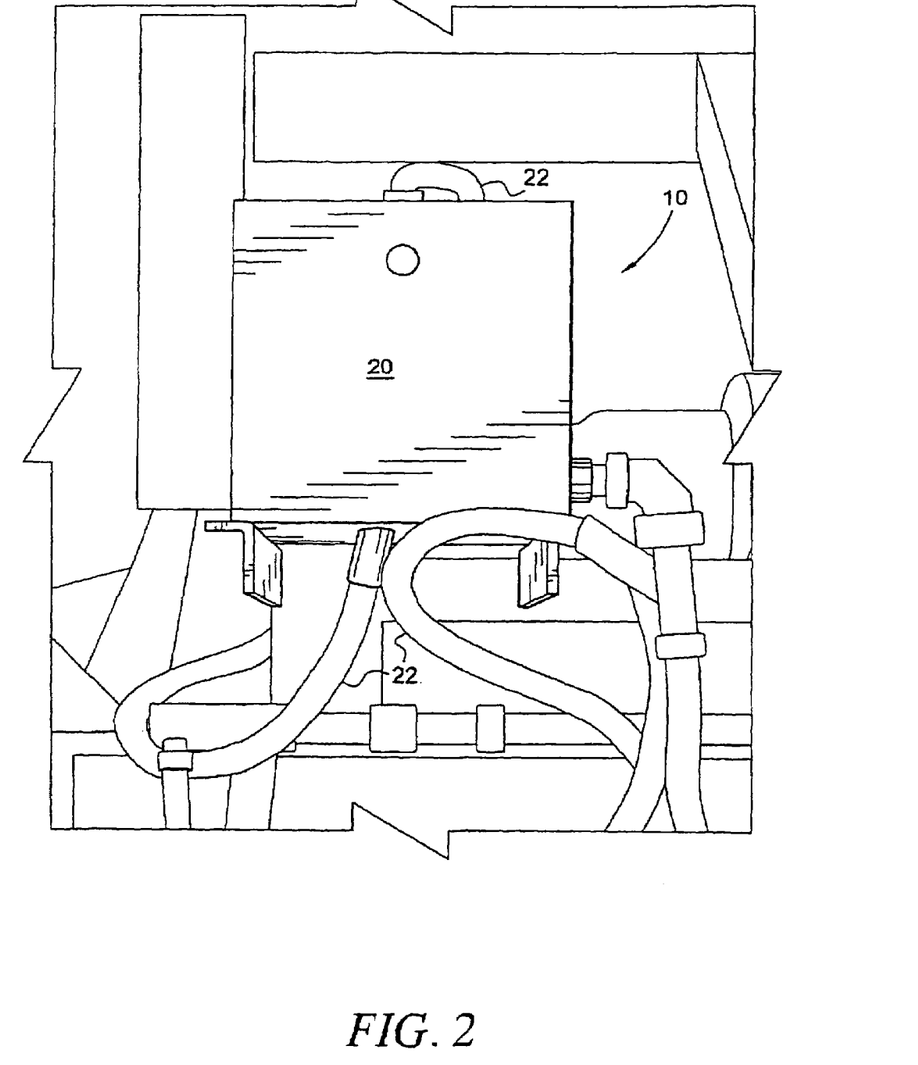
FIG. 2 is an enlarged-scale elevational view of the balance of the monitoring employed in the system according to the present invention.
Figure 3:
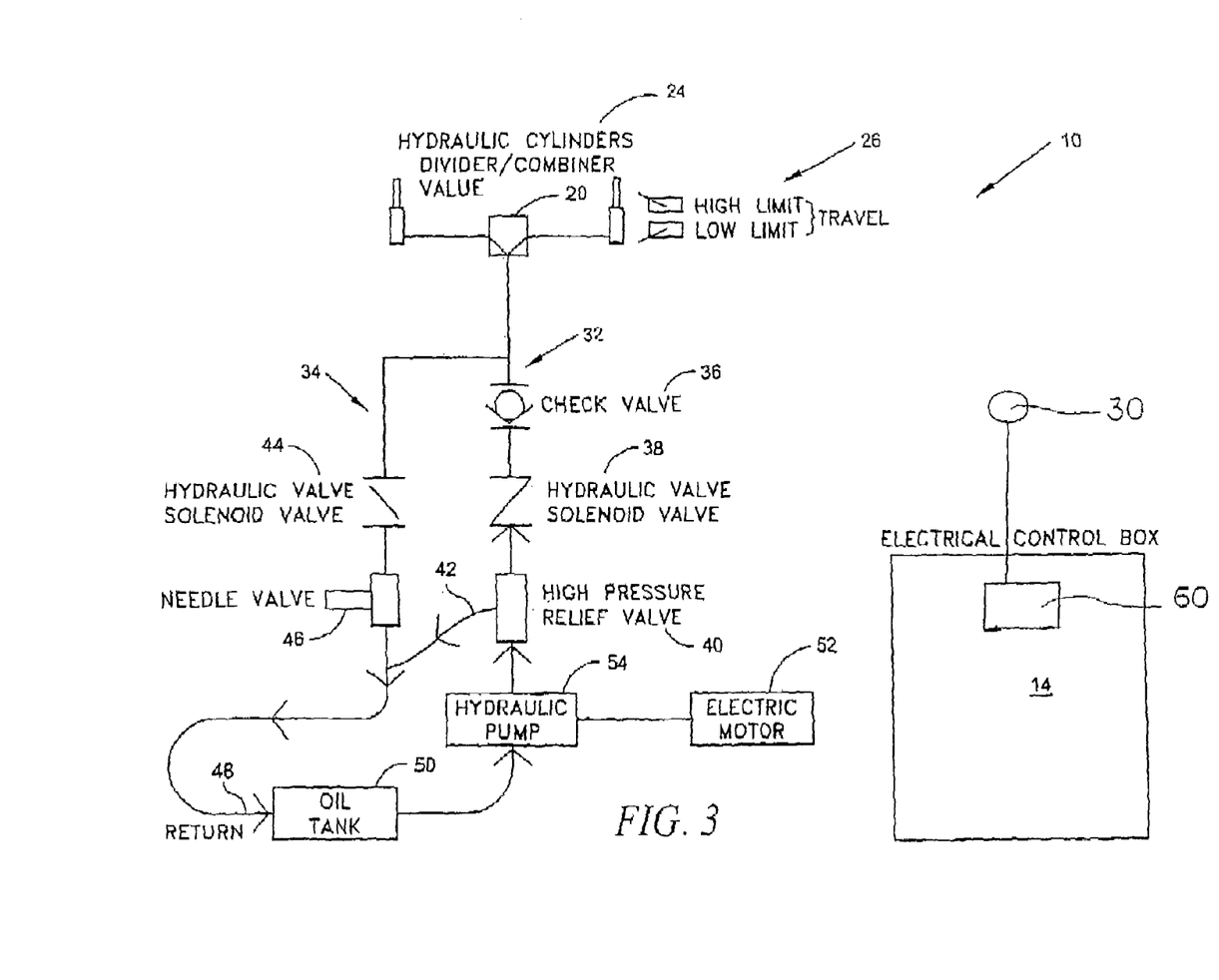
FIG. 3 is a schematic diagram of the various units employed in the hydraulic system according to the present invention.

The present invention is directed in FIGS. 1A, 1B, 2 and 3 to a weight sensing system 10 for a log washer tank 12 for adjusting the inclination of the tank in response to changes in the load of particulate material to be washed in the tank 12, shown partially in FIG. 1A. In the drawings, the numeral 14 refers to an electrical control box. Control box 14 is connected to a conventional weight sensor 30 (FIG. 3). Sensor 30 may be any type of weight sensor such as a load cell or the like. Sensor 30 may be positioned at any location wherein it can sense the weight of the aggregate load within the log washer tank 12. Sensor 30 is designed to send an electrical signal to the electrical control box 14 to control the angle of inclination of the aggregate in the log washer tank: (1) when the weight of the aggregate in the log washer tank reaches a high weight limit; (2) when the weight of the aggregate in the log washer tank reaches a low weight limit; and (3) when the weight of the aggregate in the log washer tank is between the high and low weight limits as determined by a programmable microcomputer which is located within the electrical control box 14 or other convenient location. A boxed divider/combiner valve 20 is depicted in FIGS. 2 and 3 having a plurality of hydraulic lines 22 connected to a hydraulic pump and reservoir, and also to a pair of hydraulic cylinders 24 for raising and lowering the tank 12. The hydraulic cylinders 24 are mounted below the upper end of the water tank 12 and on opposite side of the tank, only one of the cylinders 24 being shown in FIG. 1A, the opposite side being symmetrical. As shown, the cylinders are preferably mounted with the tank 12 bearing on the bottom end of the cylinder, and the ram or piston rod resting on a fixed support.

As shown in FIG. 3, the divider/combiner valve 20 the hydraulic pressure actuating the two hydraulic cylinders 24 equally. A predetermined high elevation limit and a low elevation limit in terms of the ram or piston rod travel is set by conventional mechanical levers which trigger high-low electrical switches 26. Divider/combiner valve 20 is connected to a high/low pressure circuit 32 and a low pressure circuit 34. The high pressure circuit 32 includes in sequence a one-way check valve 36 to prevent back flow from the cylinders 24 to the pumps 54, but which will open on excessive pressure from the pump 54 to raise the cylinders 24, a normally closed hydraulic valve/solenoid element 38, and a high pressure relief valve 40 which dumps off excessive hydraulic pressure through line 42 to the low pressure circuit 34. The low pressure circuit 34 consists of a normally closed hydraulic valve/solenoid 44, a needle valve 46, and a hydraulic fluid return line 48 that also receives fluid from the hydraulic line 42 to flow to the hydraulic oil supply tank 50. The needle valve 46 regulates how quickly the tank 12 is lowered. When hydraulic fluid is required for extending the hydraulic cylinders 24 by signal from the weight sensor 30, an electric or diesel motor 52 is energized by the electrical control box 14 to start and run an auxiliary hydraulic pump 54 to increase the hydraulic pressure to the predetermined degree of inclination.

As the load in the upper end of the washer tank 12 increases, the additional weight is sensed by the weight sensor 30 to increase hydraulic fluid pressure in the system. When the weight of the aggregate in the log washer tank 14 exceeds a predetermined weight limit, the sensor 30 triggers the solenoid connected to the normally closed hydraulic valve/solenoid 44 in the return line 34 to release fluid from the cylinders 24, thereby lowering the tank 12 until the weight of the aggregate in the tank 12 does not exceed the high weight limit or until the maximum low level limit of the ram or the piston rod travel is reached. This action increases production flow through the log washer tank 12, but adequate cleaning is maintained by the greater quantity of particulate matter providing the scrubbing action in the tank. When the weight of the aggregate in the tank 12 is under a predetermined weight limit, the sensor 30 triggers the solenoid connected to the hydraulic valve 38 to open it to increase fluid flow into the hydraulic cylinders 24, thereby raising the tank until the weight of the aggregate in the tank 12 exceeds the low weight limit or until the maximum high level limit of the ram or piston rod travel is reached. The action slows production flow through the log washer tank 12, but increases the scrubbing period to compensate for the reduced volume of particulate material to maintain adequate cleaning of the particulates.

Figure 4:
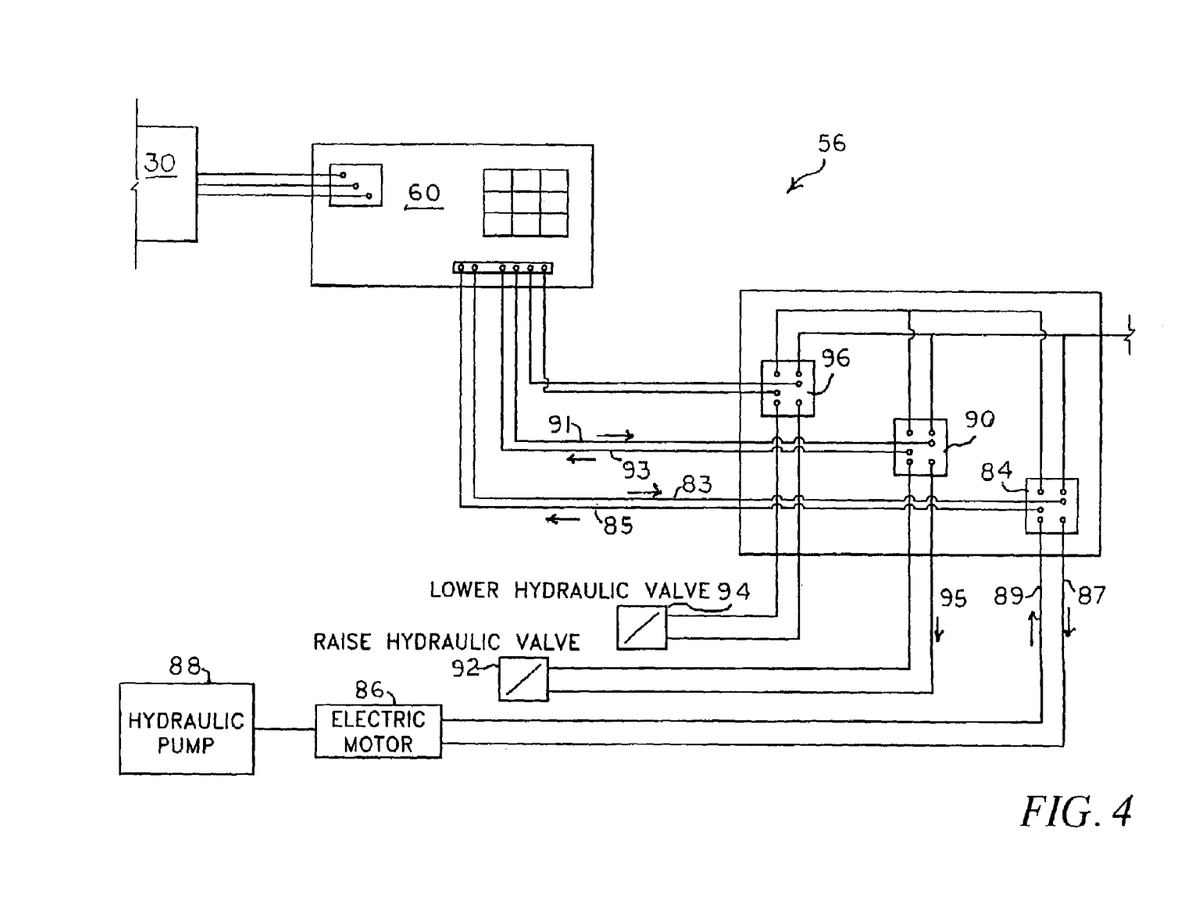
FIG. 4 is a schematic circuit diagram illustrating the operation of a modified load sensing system according to the present invention.
Figure 5:
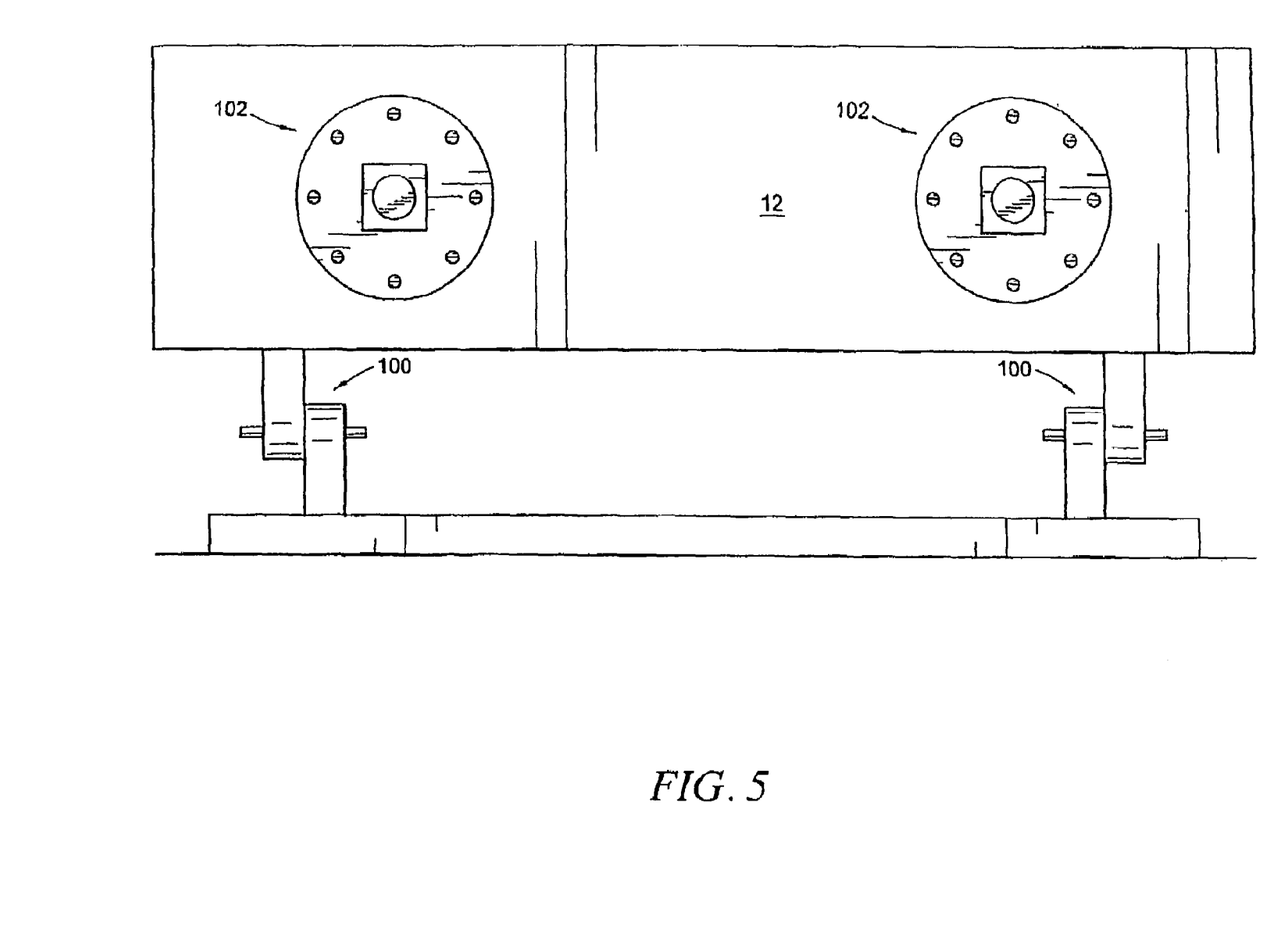
FIG. 5 is an elevational view of the lower end of the washing tank showing the pair of hinges required for adjusting the inclination of the washing tank.

FIG. 4 shows a partial schematic diagram of the electrical control system 56 for raising and lowering the hydraulic cylinders 24 by actuating valves 92 and 94, respectively. The circuit 56 includes the weight sensor 30 that sends an appropriate signal to the programmable logic unit or microcomputer 60. The microcomputer is programmed to indicate that if the load in the tank 12 is lighter than the normal weight range, a signal will be transmitted by line 83 to the light load indicator contactor coil device 84 to energize its closure to complete the circuit back to the microcomputer 60 by line 85. Current from the coil device 84 is initiated to energize the electric motor 86 by line 87 to increase the hydraulic pressure in the system by pump 88. Now, the microcomputer 60 will energize the second contactor coil device 90 by line 91 to close and complete its circuit back by line 93 to the microcomputer 60. The current from coil device 90 will energize and open the hydraulic raising valve coil 92 to raise the incline of the tank 12 to increase the washing efficiency of the light load. Once the load increases to the desired preset limit of the logic controller unit 60, the logic controller unit will stop the current to both the light load indicator contactor 84 by line 83 and the coil contactor device 90 by line 91. The washer tank 12 will operate at this angle of inclination until the microcomputer 60 receives a signal from sensor 30 that falls within the operating parameters of the program to lower the incline according to the load in the washer tank 12. When this signal is received, the microcomputer 60 will initiate a signal from an output terminal to a coil contactor unit 94 to energize it to complete the circuit back to the microcomputer 60. Current from the coil contactor unit 96 will energize the opening of the lowering hydraulic valve coil 94 to return the oil from the hydraulic cylinders to the hydraulic oil reservoir and cause the lowering of the inclination of the washer tank 12. The washer tank will lower until the load falls back into the preset operating range parameters or until the load reaches the preset lower limit. Now, the washer tank 12 may raise or lower according to the position it is in and the preset operating conditions.

Thus, a log washing tank that can be inclined according to preset programmed conditions of the measured load by a microcomputer system to operate the hydraulic cylinders has been shown which is fully effective.

It is to be understood that the present invention is not limited to the embodiment described above, but encompasses any and all embodiments within the scope of the following claims.

I claim:

1. A programmable microcomputer controlled load sensing system for a log washer apparatus for washing off aggregate material, comprising:
   a log washer tank having a pivotally mounted lower end and having an upper end;
   a pair of hydraulic cylinders, each hydraulic cylinder having a cylinder base depending from the upper end of the log washer tank and a piston rod attached to a fixed ground support, said hydraulic cylinders disposed on opposite width sides of the log washer tank;
   a combiner/divider valve connected to said pair of hydraulic cylinders;
   a hydraulic pump and a hydraulic fluid reservoir connected to the combiner/divider valve for pumping hydraulic fluid to and receiving said fluid from said combiner/divider valve for extending and retracting the piston rods;
   a sensor which detects changes in the weight of the aggregate material in said log washer tank;
   said sensor having a first state when the weight of the aggregate in said log washer tank reaches a high weight limit, a second state when the weight of the aggregate material in said log washer tank reaches a low weight limit, and a third state when the weight of the aggregate in said log washer tank is between the high and low weight limits as determined by a programmable microcomputer;
   raising means for extending the piston rods of the pair of hydraulic cylinders when the weight of the aggregate material in said log washer tank falls below the low weight limit as detected and controlled by the programmable microcomputer; and
   lowering means for retracting the piston rods of the pair of hydraulic cylinders when the weight of the aggregate material in said log washer tank is above the high weight limit as detected and controlled by the programmable microcomputer;
   whereby said log washer tank is raised and lowered to an angle of incline with only the aggregate material load by the programmable microcomputer to promote efficient washing in response to changes in weight of each load.

2. The programmable microcomputer controlled load sensing system according to claim 1, further comprising a check valve disposed between said hydraulic pump and said combiner/divider valve for preventing back flow of hydraulic fluid through said hydraulic pump.

3. The programmable microcomputer controlled load sensing system according to claim 1, further comprising a high pressure relief valve disposed between said hydraulic pump and said combiner/divider valve for diverting hydraulic fluid to said hydraulic reservoir when the weight of the aggregate material in said log washer tank exceeds the high weight limit as controlled by the programmable microcomputer.

4. The programmable microcomputer controlled load sensing system according to claim 1, wherein said raising means comprises a hydraulic valve disposed between said hydraulic pump and said combiner/divider valve, said hydraulic valve having a solenoid connected to said sensor for opening and closing said hydraulic valve.

5. The programmable microcomputer controlled load sensing system according to claim 1, wherein said lowering means comprises a hydraulic valve disposed between said hydraulic reservoir and said combiner/divider valve, said hydraulic valve having a solenoid connected to said sensor for opening and closing said hydraulic valve.

6. The programmable microcomputer controlled load sensing system according to claim 1, further comprising a needle valve disposed between said combiner/divider valve and said hydraulic reservoir for regulating the flow rate of hydraulic fluid to said hydraulic reservoir.

7. A programmable microcomputer controlled load sensing system for a log washer apparatus for washing off aggregate material, comprising:

a log washer tank having a pivotally mounted lower end and having an upper end;

a pair of hydraulic cylinders, each hydraulic cylinder having a cylinder base depending from the upper end of the log washer tank and a piston rod attached to a fixed ground support, said hydraulic cylinders disposed on opposite width sides of the log washer tank;

a combiner/divider valve connected to said pair of hydraulic cylinders;

a hydraulic pump and a hydraulic fluid reservoir connected to the combiner/divider valve for pumping hydraulic fluid to and receiving said fluid from said combiner/divider valve for extending and retracting the piston rods;

a programmable microcomputer;

a sensor which senses changes in the weight of the aggregate material in said log washer tank and supplies that information to said microcomputer;

raising means for extending the piston rods of the said pair of hydraulic cylinders when the weight of the aggregate in said log washer tank falls below the low weight limit as detected and controlled by said microcomputer; and lowering means for retracting the piston rods of the said pair of hydraulic cylinders when the weight of the aggregate material in said log washer tank is above the high weight limit as detected and controlled by said microcomputer;

whereby said log washer tank is raised and lowered to an angle of incline with only the aggregate material load by the programmable microcomputer to promote efficient washing in response to changes in weight of each load.

* * * * *